(12) United States Patent  (10) Patent No.: US 9,051,096 B2
Tuan  (45) Date of Patent: Jun. 9, 2015

(54) SEALING RING

(71) Applicant: Ronald Tuan, Nantou County (TW)

(72) Inventor: Ronald Tuan, Nantou County (TW)

(*) Notice: Subject to any disclaimer, the term of this patent is extended or adjusted under 35 U.S.C. 154(b) by 0 days.

(21) Appl. No.: 14/506,681

(22) Filed: Oct. 5, 2014

(65) Prior Publication Data

US 2015/0102035 A1    Apr. 16, 2015

Related U.S. Application Data

(63) Continuation-in-part of application No. 14/051,641, filed on Oct. 11, 2013, now Pat. No. 8,887,949.

(51) Int. Cl.
  *B65D 53/02*   (2006.01)
  *B65D 43/06*   (2006.01)
  *B65D 53/00*   (2006.01)

(52) U.S. Cl.
  CPC .............. *B65D 53/00* (2013.01); *B65D 53/02* (2013.01); *B65D 2543/00972* (2013.01); *B65D 2543/00564* (2013.01); *B65D 43/06* (2013.01); *B65D 2543/00435* (2013.01)

(58) Field of Classification Search
  CPC ........ B65D 53/00; B65D 53/02; B65D 43/06; B65D 43/065; B65D 2543/00972; B65D 2543/00787; B65D 2543/00537; B65D 2543/00564; B65D 2543/00435
  USPC ........ 220/4.21, 287, 326, 784, 787, 793, 799, 220/801, 319, 320, 796, 798, 378
  See application file for complete search history.

(56) References Cited

U.S. PATENT DOCUMENTS 1,904,091 A * 4/1933 Shoop ............................ 220/803
2,168,734 A * 8/1939 Freeman ....................... 215/270

* cited by examiner

*Primary Examiner* — Fenn Mathew
*Assistant Examiner* — James N Smalley
(74) *Attorney, Agent, or Firm* — Bruce Stone LLP; Joseph A. Bruce

(57) ABSTRACT

A sealing ring is an elastic annular member with an engaging groove for insertion of an insertion member. The engaging groove includes a sealing surface and an opposite abutting surface which is inclined from the bottom of the engaging groove toward the open end of the engaging groove, so that the open end of the engaging groove is narrower than the bottom of the engaging groove. When the insertion member is inserted in the engaging groove, the abutting surface and the sealing surface will transmit pressure to make the abutting surface of the abutting portion and the sealing surface of the sealing lip of the sealing ring are pressed against two sides of the inserted insertion member. Therefore, the sealing performance of the sealing ring is improved.

7 Claims, 9 Drawing Sheets

SEALING RING

This application is a continuation in part of U.S. patent application Ser. No. 14/051,641, which claims the benefit of the earlier filing date of Oct. 11, 2013.

BACKGROUND OF THE INVENTION

1. Field of the Invention

The present invention relates to a sealing ring, and more particularly to a sealing ring which is disposed at two objects to create a sealing effect therebetween.

2. Description of the Prior Art

A conventional sealed container, as shown in FIG. 1, comprises a container body 10, a cover 11 and a sealing ring 12. The container body 10 is provided along the outer peripheral edge with a plurality of connecting portions 13. The cover 11 is formed with an engaging groove 14 and a plurality of engaging portions 15. The cover 11 covers the container body 10 in such a manner that the engaging portions 15 are engaged with the connecting portions 13, and the sealing ring 12 is disposed in the engaging groove 14. The sealing ring 12 will be pressed downward when the engaging portions 15 are engaged with the connecting portions 13, so that the container body 10 is sealed in an airtight manner.

However, this conventional sealed container still suffers from the following disadvantages:

Firstly, the sealing ring 12 is disposed in the engaging groove 14 of the cover 11 and difficult to take out to clean, which is likely to lead to accumulation of mold and bacteria, and cause health concerns.

Secondly, with the use of the connecting portion 13 and the engaging portion 15, this sealed container requires great effort to open and therefore is inconvenient to use.

Finally, the sealing ring 12 is simply structured, so the sealing effect of the sealing ring 12 sometimes is not good.

The present invention has arisen to mitigate and/or obviate the afore-described disadvantages.

SUMMARY OF THE INVENTION

The primary objective of the present invention is to provide a sealing ring which is provided for insertion of an insertion member, wherein the sealing ring is easy to take out to clean with less effort. Furthermore, the sealing effect of the sealing ring is also improved.

To achieve the above objective, a sealing ring in accordance with the present invention is provided for insertion of an insertion member. The sealing ring includes a connecting portion at a top thereof, a base portion which is formed at one side of the connecting portion and located below the connecting portion, and an abutting portion which is formed at a bottom of the base portion. The abutting portion is a tapered structure with a sharp end, another side of the connecting portion extends downward to form a sealing lip, so that the sealing lip, the connecting portion, the base portion and the abutting portion define an engaging groove which opens downward. The sealing lip includes a sealing surface which extends from up to down and is formed on an inner surface of the engaging groove. The abutting portion includes an abutting surface which is formed on an inner surface of the engaging groove and located opposite to the sealing surface. The abutting surface is inclined from the bottom of the engaging groove toward the open end of the engaging groove, so that the open end of the engaging groove is narrower than the bottom of the engaging groove. The insertion member is inserted in the engaging groove, in a manner that the abutting surface of the abutting portion and the sealing surface of the sealing lip of the sealing ring are pressed against two sides of the inserted insertion member, the insertion member exerts an outward pressing force F1 on the abutting portion to cause outward deformation of the abutting portion, which then produces a pushing force F2 toward the base portion. The base portion generates an internal stress which is transmitted through the connecting portion and makes the sealing lip exert a pressure stress F3 on the abutting portion, thus forming an elastic force making the abutting surface of the abutting portion and the sealing surface of the sealing lip press against the insertion member in an airtight manner. The top edge of the connecting portion is pressed by a cover, which increases the pressure on the base portion, so as to further increase the elastic force.

The sealing ring of the present invention offers the following advantages: the sealing ring is formed with an engaging groove for insertion of the insertion member, and the user can remove the insertion member from the sealing ring. The sealing ring is an elastic annular member, so that the sealing ring can be used with less effort, without the problem that the conventional sealed container requires great effort to open since it requires the use of the connecting portion and the engaging portion. Besides, when the insertion member is inserted in the sealing ring, it will produce an outward pressing force F1 a pushing force F2 and a pressure stress F3, making the abutting surface of the abutting portion and the sealing surface of the sealing lip press against the insertion member in an airtight manner.

DETAILED DESCRIPTION OF THE PREFERRED EMBODIMENTS

Figure 1:
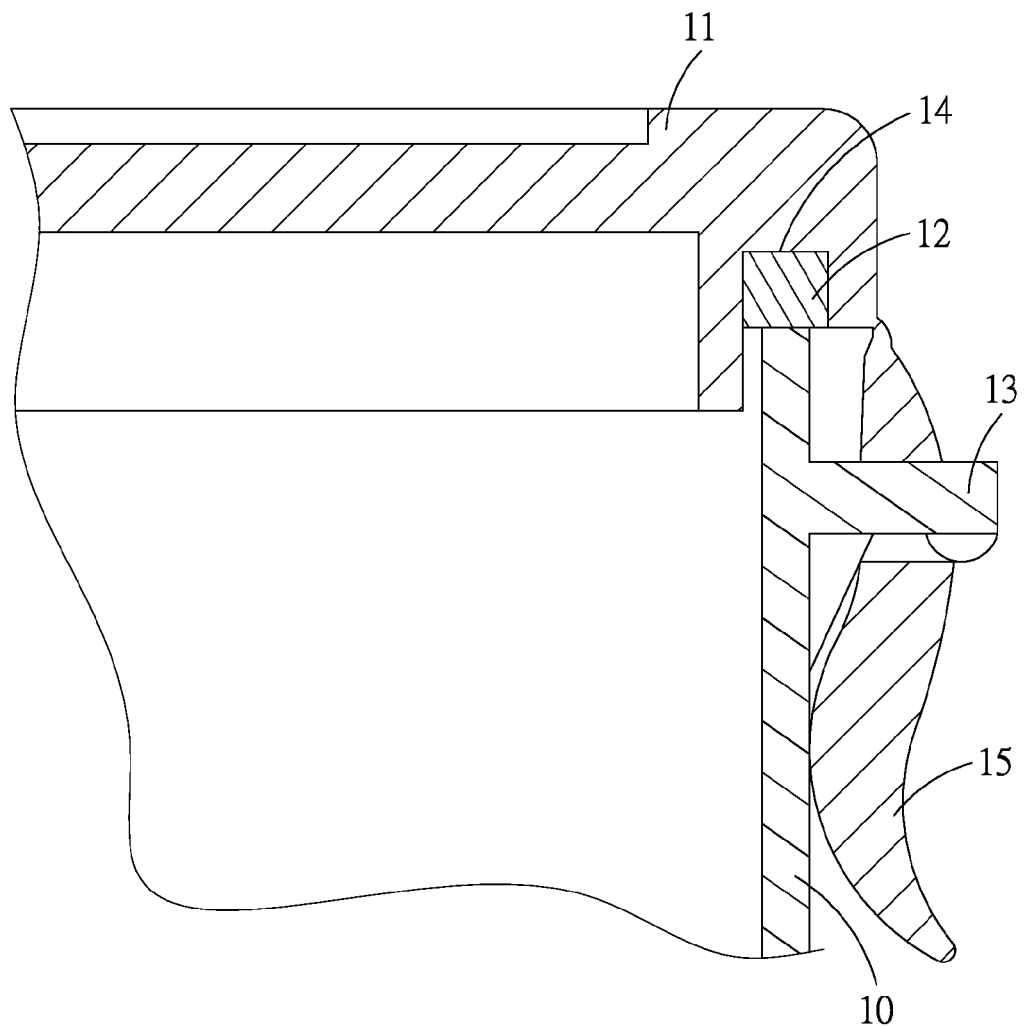
FIG. 1 is a cross sectional view of a conventional sealing structure.

The present invention will be clearer from the following description when viewed together with the accompanying drawings, which show, for purpose of illustrations only, the preferred embodiment in accordance with the present invention.

Referring to FIGS. 2-9, a sealing ring 20 in accordance with the present invention is a circular or square elastic annular member provided for insertion of an insertion member 50. From a cross sectional view, the sealing ring 20 includes a connecting portion 21 at the top thereof, a base portion 22 which is formed at one side of the connecting portion 21 and located below the connecting portion 21, and an abutting portion 23 which is formed at the bottom of the base portion 22. The abutting portion 23 is a tapered structure with a sharp end. Another side of the connecting portion 21 extends downward to form a sealing lip 24, so that the sealing lip 24, the connecting portion 21, the base portion 22 and the abutting portion 23 define an engaging groove 25 which opens downward. The sealing lip 24 includes a sealing surface 241 which extends from up to down and is formed on an inner surface of the engaging groove 25. The abutting portion 23 includes an abutting surface 231 which is formed on an inner surface of the engaging groove 25 and located opposite to the sealing surface 241. The abutting surface 231 is inclined from the bottom of the engaging groove 25 toward the open end of the engaging groove 25, so that the open end of the engaging groove 25 is narrower than the bottom of the engaging groove 25. In this embodiment, the insertion member 50 is a container with an open end, and the sealing ring 20 is a square ring.

Referring then to FIGS. 7, 8 and 2-6, the insertion member 50 is inserted in the engaging groove 25, and more specifically, the peripheral edge of the open end of he insertion member 50 is inserted in the engaging groove 25, in a such manner that the abutting surface 231 of the abutting portion 23 and the sealing surface 241 of the sealing lip 24 of the sealing ring 20 are substantially pressed against two sides of the inserted insertion member 50. The insertion member 50 will exert an outward pressing force F1 on the abutting portion 23 to cause outward deformation of the abutting portion 23, which then produces a pushing force F2 toward the base portion 22. Therefore, the base portion 22 generates an internal stress which is transmitted through the connecting portion 21 and makes the sealing lip 24 exert a pressure stress F3 on the abutting portion 23, thus forming an elastic force making the abutting surface 231 of the abutting portion 23 and the sealing surface 241 of the sealing lip 24 press against the insertion member 50 in an airtight manner. The top edge of the connecting portion 21 is pressed by a cover 51, which increases the pressure on the base portion 22, so as to further increase the elastic force.

The engaging groove 25 is further provided with a compression space 26 located at the position of the base portion 22. When the base portion 22 is pressed, the air in the compression space 26 will be discharged out of the end of the abutting portion 23 by flowing between the abutting surface 231 and the surface of the insertion member 50, creating a vacuum in the compression space 26, so that atmospheric pressure will produce a pressing force F4 to push the abutting portion 23 toward the sealing lip 24, as shown in FIG. 10, making the insertion member 50 engaged in the engaging groove 25 more tightly.

At the top end of the connecting portion 21 of the sealing ring 20 is formed a plurality of nip portions 27. Each of the nip portions 27 includes a vertical connecting wall 271 with a certain height, and a horizontal clip portion 272 extending horizontally from the end of the vertical connecting wall 271, so as to define a nip groove 28 between the horizontal clip portion 272 and the sealing ring 20, and the cover 51 is inserted in the nip groove 28. In this embodiment, the sealing ring 20 is a rectangular ring, and there are four nip portions 27 located at four corners of the rectangular sealing ring 20.

Figure 10:
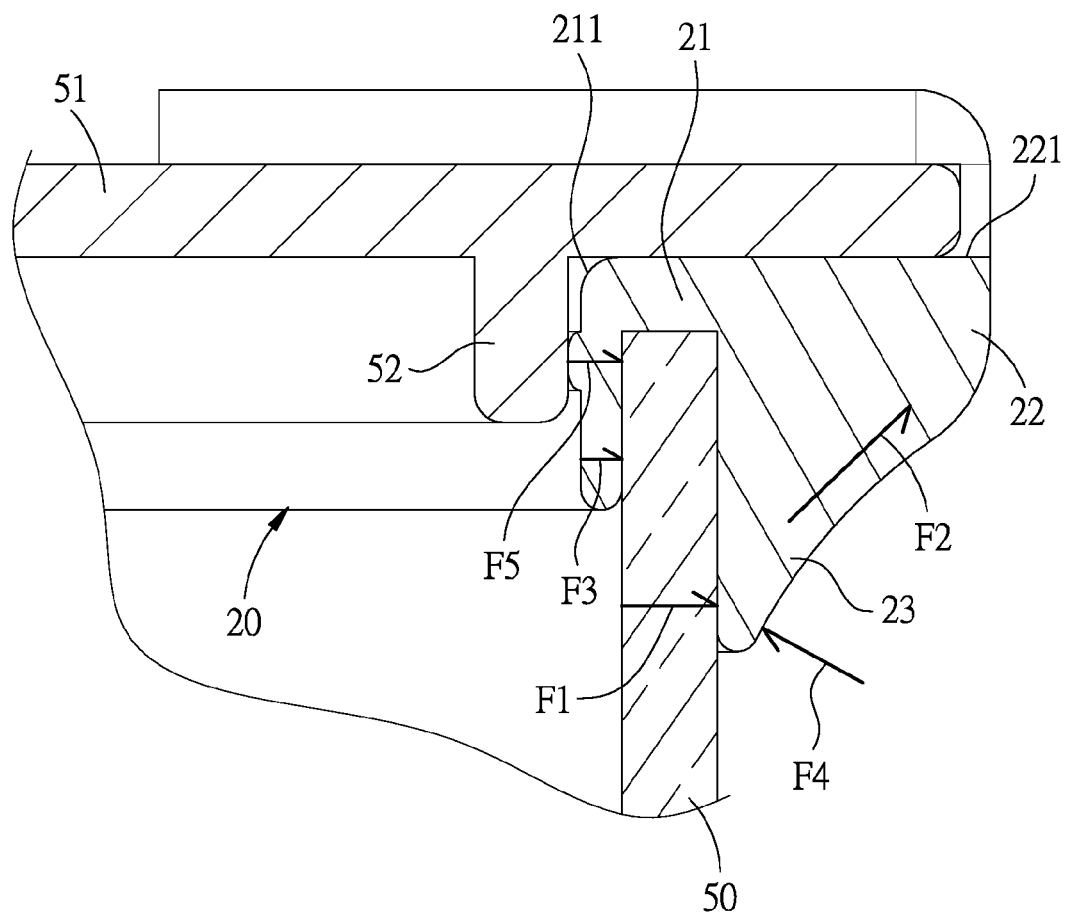
FIG. 10 is a cross sectional view of another embodiment of the sealing ring and the container in accordance with the present invention.

Referring then to FIG. 10, shows is a cross sectional view of another embodiment of the sealing ring of the present invention. An abutting end 211 is formed at the connection between the connecting portion 21 and the sealing lip 24, and the sealing lip 24 includes a slanting conical stop portion 29 which extends horizontally toward the center of the sealing ring 20 and is located at the bottom of the engaging groove 25. The cover 51 is provided with a protruding flange 52. When the cover 51 covers the sealing ring 20, the protruding flange 52 of the cover 51 will press against and exert a pressing force on the stop portion 29 of the sealing ring 20, the pressing force will make the sealing lip 24 produce an abutting force F5 toward the base portion 22, thus further improving the sealing effect.

Referring to FIG. 10 again, at the connection between the base portion 22 and the connecting portion 21 is formed a corner end 221 (at the outer top edge of the sealing ring 20). When the insertion member 50 inserts in the engaging groove 25, the sealing ring 20 will be deformed to make the corner end 221 slightly higher than the connecting portion 21, due to the fact that the base portion 22 is affected by the pushing force F2 transmitted from the abutting portion 23.

Figure 2:
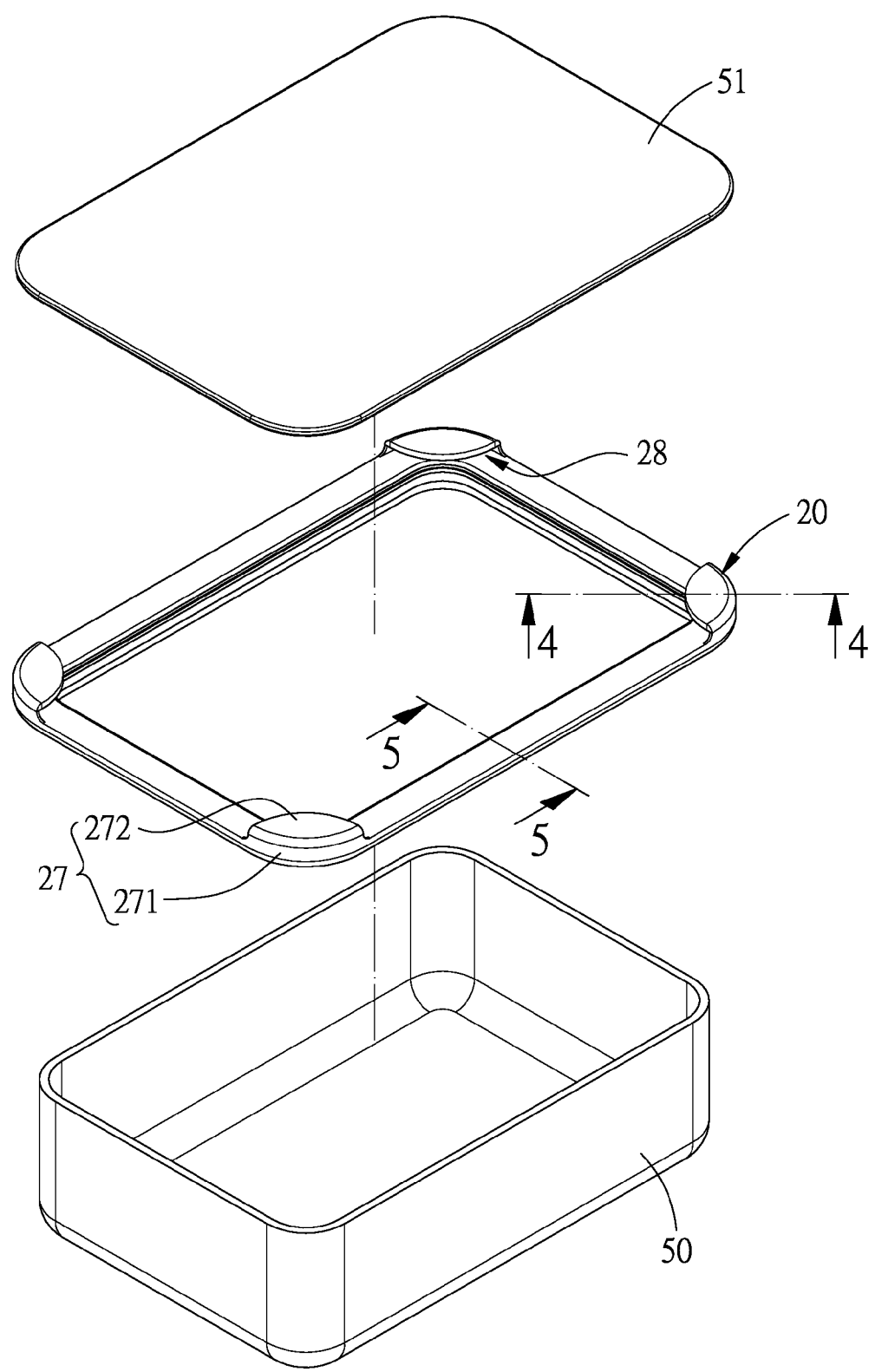
FIG. 2 is an exploded view of a sealing ring and a container in accordance with the present invention.
Figure 3:
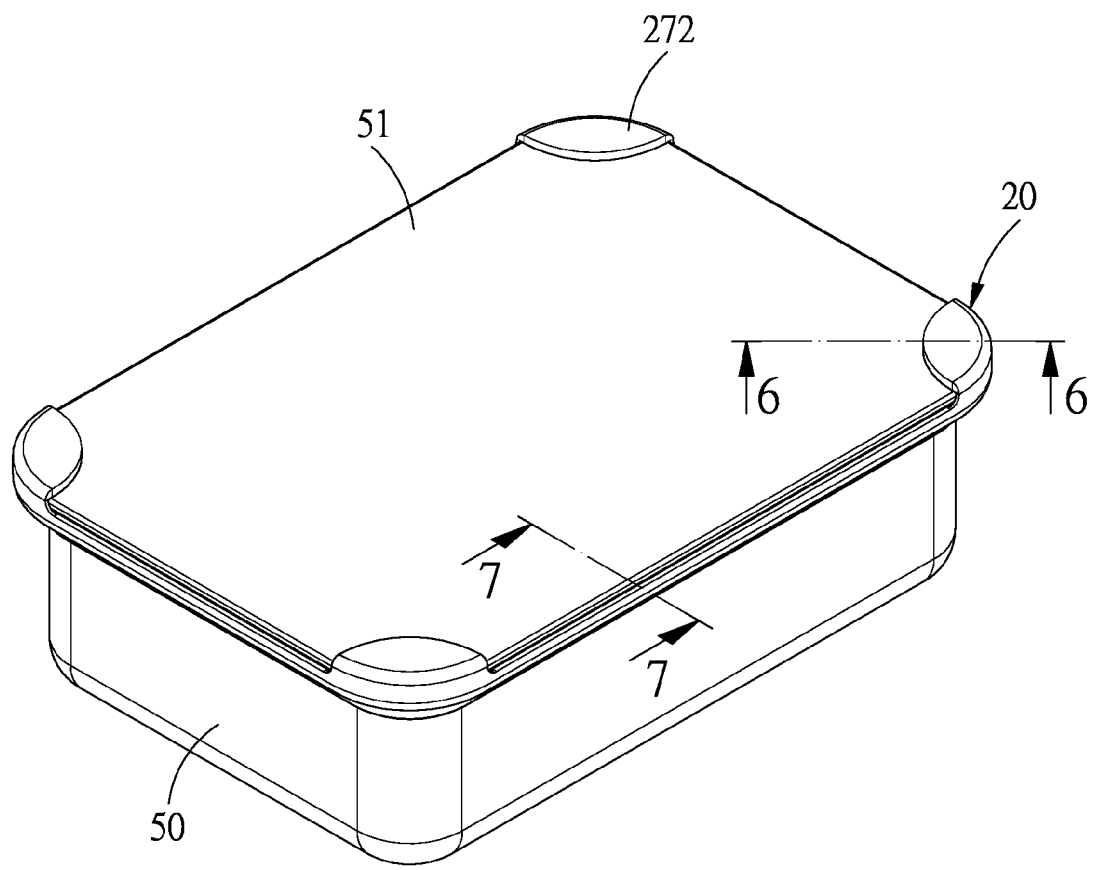
FIG. 3 is an assembly view of the sealing ring and the container in accordance with the present invention.
Figure 4:
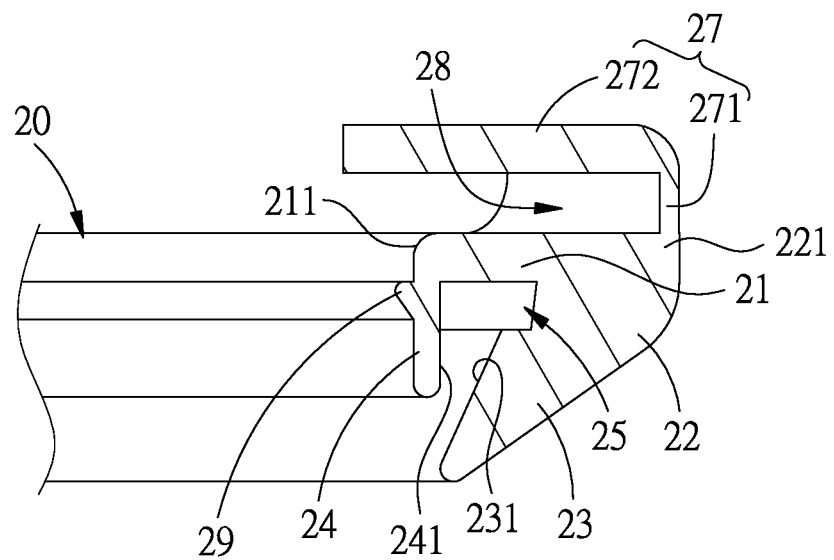
FIG. 4 is a cross sectional view of a part of the sealing ring in accordance with the present invention.
Figure 5:
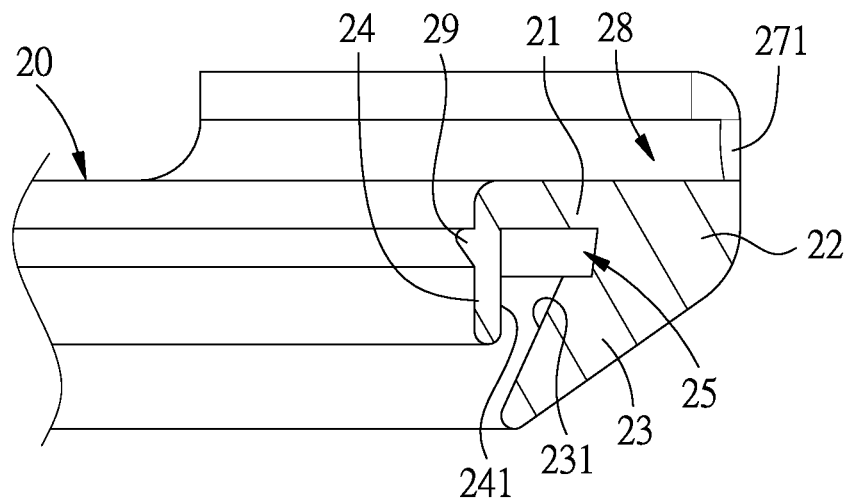
FIG. 5 is another cross sectional view of a part of the sealing ring in accordance with the present invention.

What mentioned are the structural relations of the main components of the embodiment, for a better understanding of the effect and operation of the present invention, reference should be made to FIG. 2. When in use, the sealing ring 20 is inserted on the insertion member 50 by the engaging groove 25, and the user can remove the sealing ring 20 from the insertion member 50, making it easier for the user to clean the sealing ring 20, the insertion member 50 and the cover 51.

It is to be noted that, when the sealing ring 20 is inserted on the insertion member 50, the insertion member 50 will apply outward pressing force F1 on the abutting portion 23 to cause outward deformation of the abutting portion 23, which then produces a pushing force F2 toward the base portion 22. Therefore, the base portion 22 generates an internal stress which is transmitted through the connecting portion 21 and makes the sealing lip 24 exert a pressure stress F3 on the abutting portion 23, thus forming an elastic force making the abutting surface 231 of the abutting portion 23 and the sealing surface 241 of the sealing lip 24 press against the insertion member 50 in an airtight manner. The top edge of the connecting portion 21 is pressed by a cover 51, which increases the pressure on the base portion 22, so as to further increase the elastic force.

Figure 6:
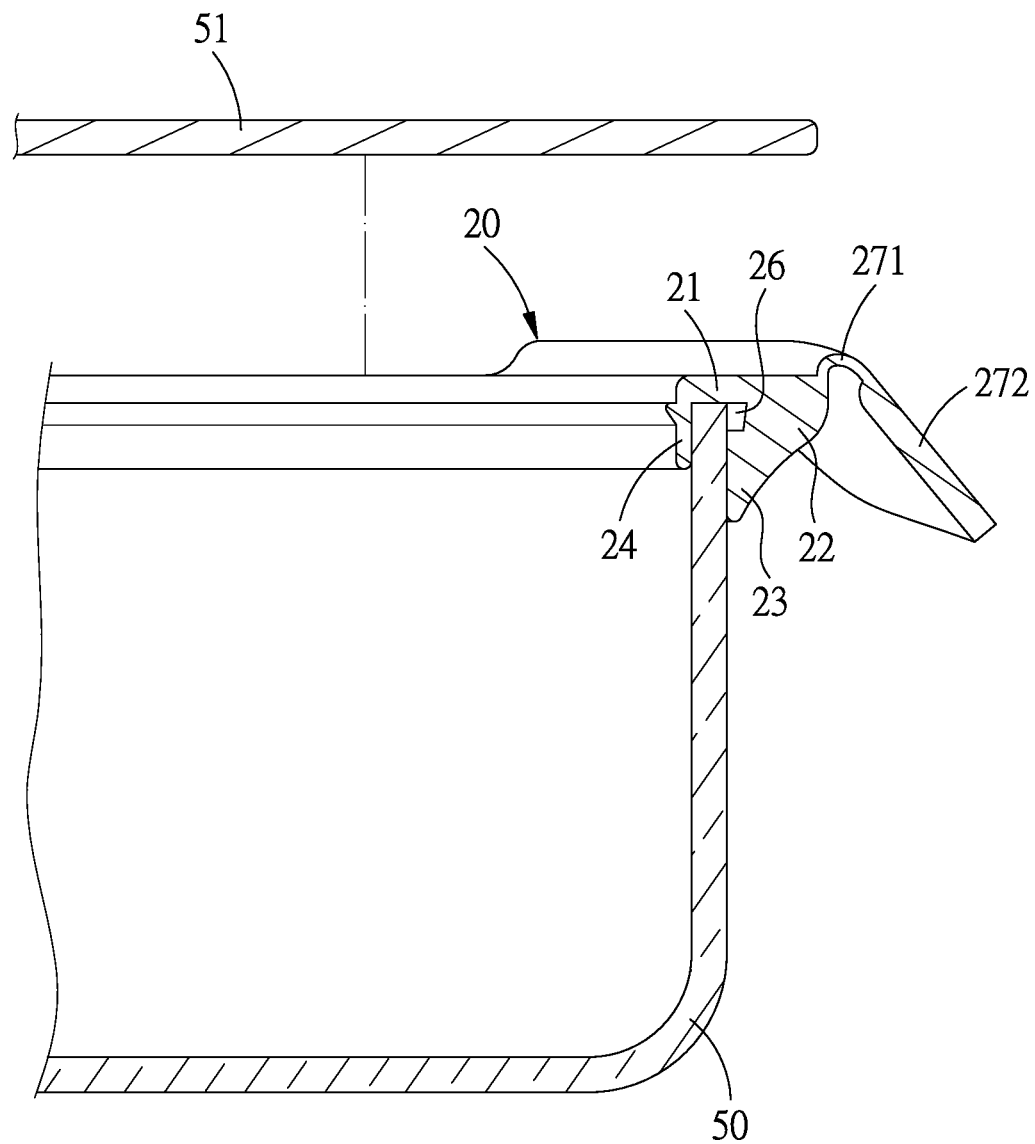
FIG. 6 is a cross sectional view of a part of the sealing ring and the container in accordance with the present invention.
Figure 7:
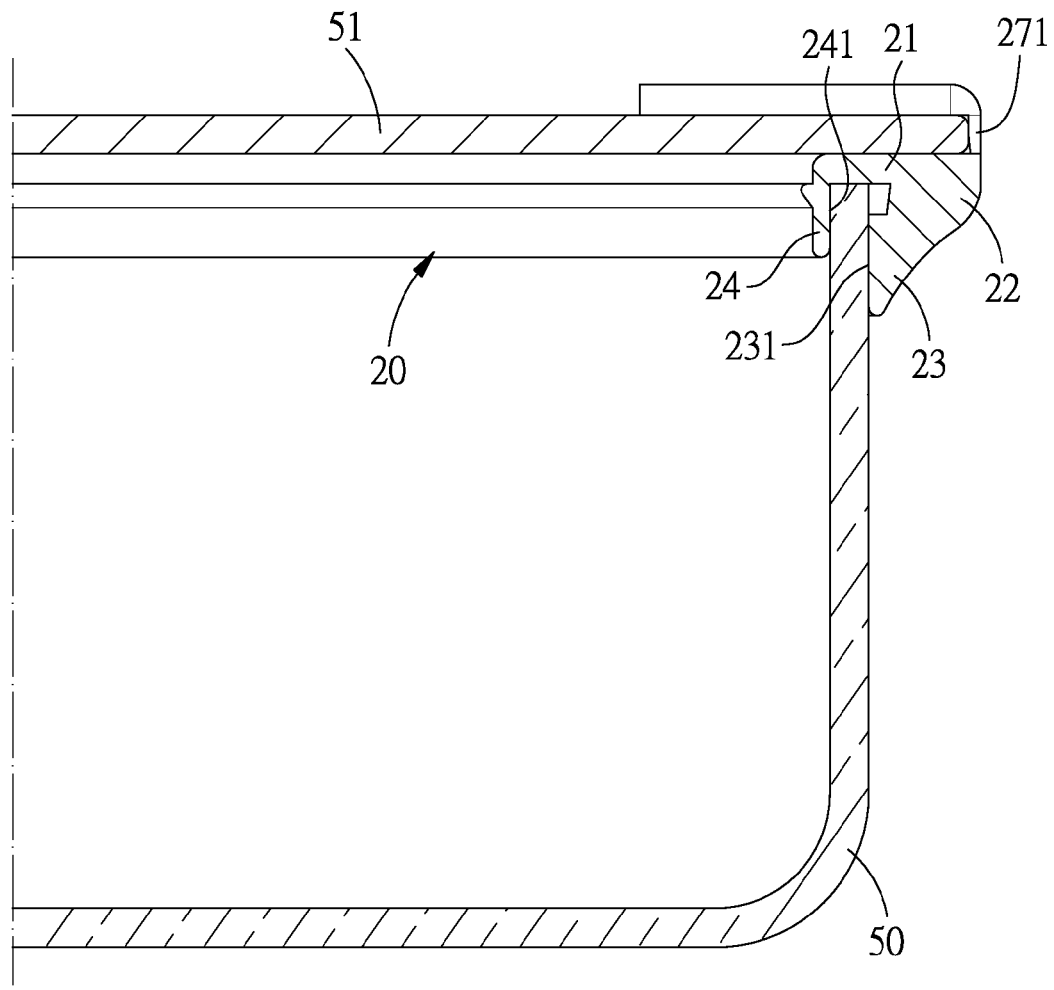
FIG. 7 is an assembly view of a part of the sealing ring and the container in accordance with the present invention.
Figure 8:
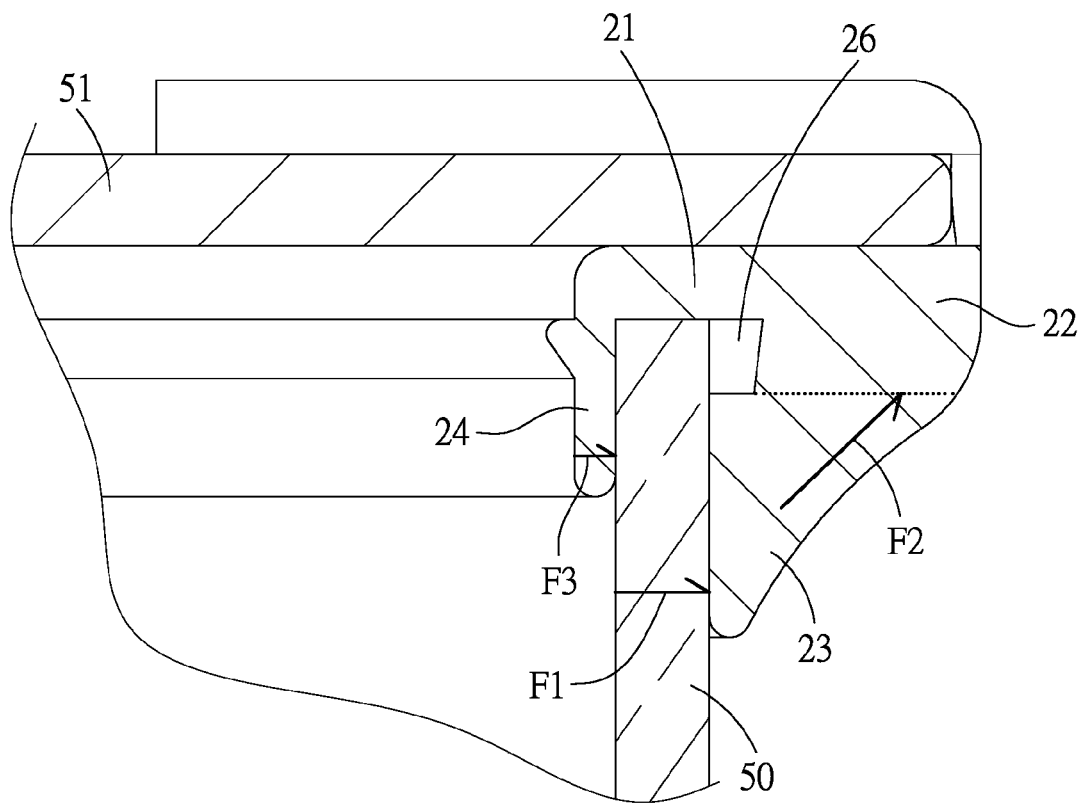
FIG. 8 is an enlarged view of a part of FIG. 7.
Figure 9:
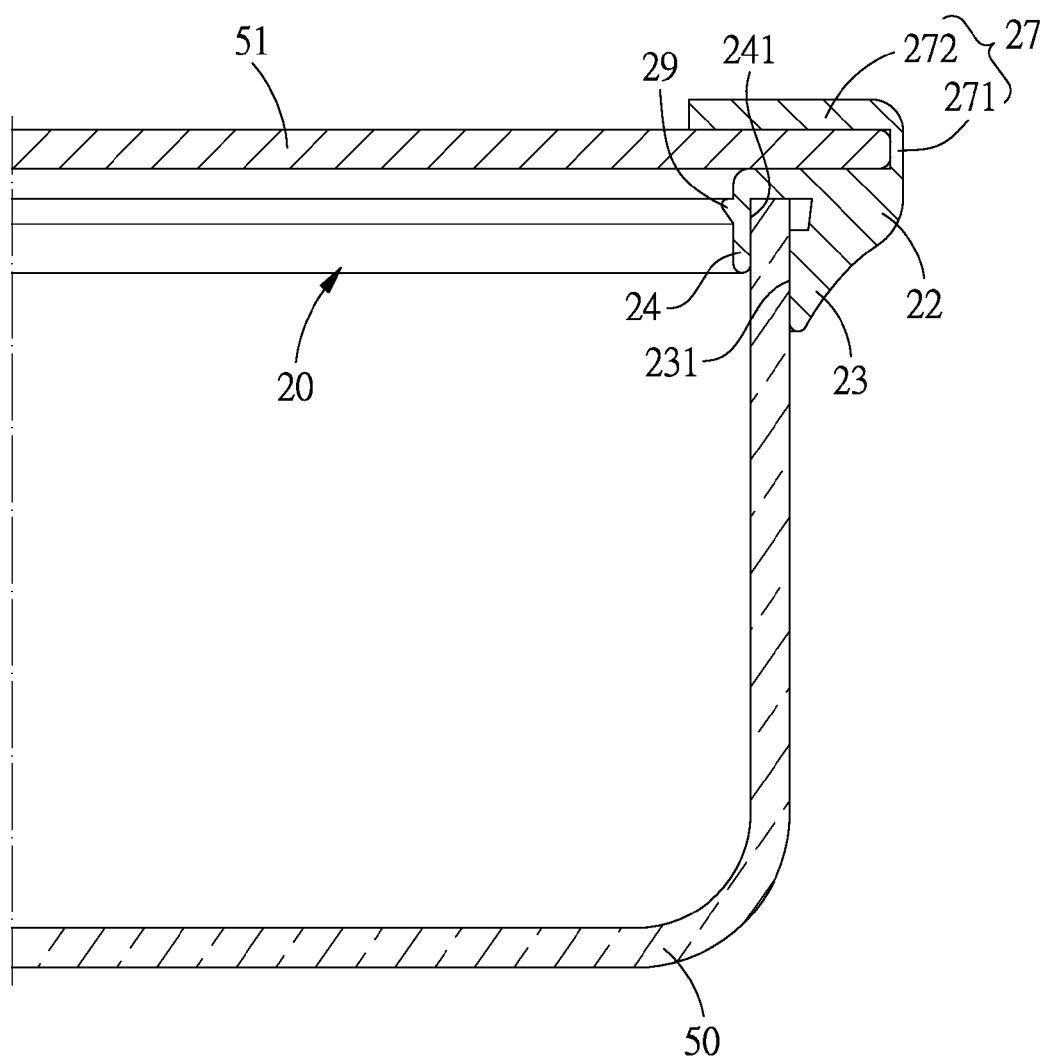
FIG. 9 is another cross sectional view of a part of the sealing ring and the container in accordance with the present invention.

Referring then to FIG. 6, the sealing ring 20 of the present invention is an elastic annular member, and therefore is easy to use. For example, to insert the cover 51 into the nip groove 28, the user can bend the horizontal clip portion 272 outward along the connecting wall 271. After the cover 51 is inserted in the nip groove 28, the horizontal clip portion 272 is bent backward along the vertical connecting wall 271, as shown in FIG. 9, so that the sealing ring 20 can be used with less effort, without the problem that the conventional sealed container requires great effort to open since it requires the use of the connecting portion 13 and the engaging portion 15.

While we have shown and described various embodiments in accordance with the present invention, it is clear to those skilled in the art that further embodiments may be made without departing from the scope of the present invention.

What is claimed is:

1. A sealing ring being an elastic annular member provided for insertion of an insertion member, the sealing ring including and comprising: a connecting portion at a top thereof, a base portion which is formed at one side of the connecting portion and located below the connecting portion, and an abutting portion which is formed at a bottom of the base portion, the abutting portion being a tapered structure with a sharp end, another side of the connecting portion extending downward to form a sealing lip, so that the sealing lip, the connecting portion, the base portion and the abutting portion define an engaging groove which opens downward, the sealing lip including a sealing surface which extends from up to down and is formed on an inner surface of the engaging groove, the abutting portion including an abutting surface which is formed on an inner surface of the engaging groove and located opposite to the sealing surface, the abutting surface being inclined from the bottom of the engaging groove toward the open end of the engaging groove, so that the open end of the engaging groove is narrower than the bottom of the engaging groove;

the insertion member being inserted in the engaging groove, in a manner that the abutting surface of the abutting portion and the sealing surface of the sealing lip of the sealing ring are pressed against two sides of the inserted insertion member, the insertion member exerts an outward pressing force F1 on the abutting portion to cause outward deformation of the abutting portion, which then produces a pushing force F2 toward the base portion, the base portion generates an internal stress which is transmitted through the connecting portion and makes the sealing lip exert a pressure stress F3 on the abutting portion, thus forming an elastic force making the abutting surface of the abutting portion and the sealing surface of the sealing lip press against the insertion member in an airtight manner, a top edge of the connecting portion being pressed by a cover, which increases the pressure on the base portion, so as to further increase the elastic force;

at a connection between the base portion and the connecting portion being formed a corner end, when the insertion member inserts in the engaging groove, the corner end will be higher than the connecting portion.

2. The sealing ring as claimed in claim 1, wherein the engaging groove is further provided with a compression space located adjacent to the base portion, when the base portion is pressed, the air in the compression space will be discharged out of the end of the abutting portion by flowing between the abutting surface and the surface of the insertion member, creating a vacuum in the compression space, so that atmospheric pressure will produce a pressing force F4 to push the abutting portion toward the sealing lip, making the insertion member engaged in the engaging groove.

3. The sealing ring as claimed in claim 1, wherein the sealing ring is circular or square shaped.

4. The sealing ring as claimed in claim 1, wherein at a top end of the connecting portion of the sealing ring is formed a plurality of nip portions, each of the nip portions includes a vertical connecting wall with a certain height, and a horizontal clip portion extending horizontally from the end of the vertical connecting wall, so as to define a nip groove between the horizontal clip portion and the sealing ring.

5. The sealing ring as claimed in claim 4, wherein the sealing ring is rectangular, and the nip portions are located at corners of the rectangular sealing ring.

6. The sealing ring as claimed in claim 1, wherein an abutting end is formed at a connection between the connecting portion and the sealing lip.

7. The sealing ring as claimed in claim 1, wherein the cover is provided with a protruding flange, and the sealing lip includes a slanting conical stop portion which extends horizontally toward a center of the sealing ring.

\* \* \* \* \*